United States Patent [19]

Hiestand

[11] Patent Number: 4,591,172
[45] Date of Patent: May 27, 1986

[54] POWER CHUCK
[75] Inventor: Karl Hiestand, Pfullendorf, Fed. Rep. of Germany
[73] Assignee: SMW Schneider & Weisshaupt GmbH, Fed. Rep. of Germany
[21] Appl. No.: 536,446
[22] Filed: Sep. 28, 1983
[30] Foreign Application Priority Data
 Oct. 9, 1982 [DE] Fed. Rep. of Germany ....... 3237521
[51] Int. Cl.$^4$ ............................................. B23B 31/10
[52] U.S. Cl. .................................... 279/1 J; 279/1 L; 279/104; 279/106; 279/121
[58] Field of Search ................ 279/121, 1 L, 110, 1 J, 279/4, 2 A, 106, 1 ME, 104
[56] References Cited
U.S. PATENT DOCUMENTS

| 2,524,485 | 10/1950 | Sloan | 279/15 |
| 2,698,185 | 12/1954 | Sloan | 279/4 |
| 3,069,181 | 12/1962 | Hohwart et al. | 279/106 |
| 3,604,717 | 9/1971 | Hohwart | 279/1 L X |
| 3,751,053 | 8/1973 | Swanson | 279/1 L X |
| 4,465,289 | 8/1984 | Banks | 279/106 X |

Primary Examiner—Gil Weidenfeld
Assistant Examiner—Glenn L. Webb
Attorney, Agent, or Firm—McGlew and Tuttle

[57] ABSTRACT

In a power chuck including jaws moved by drivers which are displaceable in the axial direction of the chuck body by means of an axially displaceable actuating member mounted in the chuck body, the actuating member is coupled to the individual drivers through two gimbal rings which compensate for unequal displacement of the jaws. The gimbal suspension can be bridged by connecting the rings rigidly to each other. A balanced as well as centric clamping of a workpiece may thus be effected. The manufacturing costs are low so that both economy and high reliability in operation are obtained.

16 Claims, 5 Drawing Figures

POWER CHUCK

FIELD AND BACKGROUND OF THE INVENTION

This invention relates in general to the construction of tool holding devices and in particular to a new and useful power chuck having individually displaceable chuck engaging jaws.

A power chuck similar to the invention, with which a workpiece can be clamped centrically or eccentrically, is disclosed and shown in German patent application No. P 31 46 171.9. The drive members of that disclosure are firmly connected each to an axially displaceable setting piston, with the pistons being actuable with pressure fluid from one or both sides and, with the provision of a balanced chucking, displaceable independently of each other. To conjointly displace the drive members, an actuating member, also received in the chuck body, is provided exerting a thrust on the drive members at least in one direction of the jaw movement.

This power chuck, in which the clamping is reversible without particular measures, has proved satisfactory in practice, however, its manufacturing costs are considerable, in view of the many parts. It is further disadvantageous that, particularly with a balanced clamping, a plurality of pressurized spaces is to be sealed, so that leaks are unavoidable.

SUMMARY OF THE INVENTION

The present invention is directed to a power chuck permitting both a balanced and, if needed, a centric clamping of the workpiece yet comprising only a few individual parts, so that an economy in manufacture is ensured. Further to be ensured is a reliable, especially also highly safe operation, and a long life.

In accordance with the invention, a power chuck is provided particularly for turning machines which comprises a chuck body having a plurality of master or clamping jaws which are guided for radial displacement outwardly or inwardly in grooves of the chuck body and which are movable each through a drive member which is inserted in the chuck body adjacent the respective jaw and is displaceable in an axial direction. The drive member has oblique surfaces or gear teeth which engages an axially displaceable actuating member for displacing the drive members. The actuating members are coupled to the individual drive members through one or two gimbal rings.

Advantageously two gimbal rings are mounted one within the other and the inner one is hinged on the actuating member into the outer gimbal ring and the outer gimbal ring is positively connected to the drive members.

Advantageously, to support the inner gimbal ring the actuating member is provided with an extension which projects toward the drive members and is provided with a pivotal surface forming a support for the inner gimbal ring and the outer gimbal ring. The outer gimbal ring is advantageously hinged to the inner gimbal ring by means of two bolts which are offset through 90° relative to the pins carrying the inner gimbal ring.

The surfaces facing each other of the actuator and the inner gimbal ring provide a spherical interengaging guide surface. The operating parts include extensions on the guide members which engage the outer gimbal ring. At least one of the cooperating surfaces of the extensions or the grooves of the interconnected parts is of a convex configuration.

The outer gimbal ring may be positively connected to the drive members to move them in their direction of displacement, or the ring may be formed with extensions which, for the same purpose, engage recesses or grooves provided in the drive members, and it is suitable, to obtain a satisfactory contact, to give at least one of the cooperating surfaces of the extension and/or the engaged grooves a convex or spherical shape.

Advantageously to support the drive members an inwardly open guide rail is provided at each of the locations remote from the jaws of the actuating member in which the drive members are retained for displacement. In order to bridge the gimbal mounting the drive members can be rigidly coupled to the actuating member. To be able to clamp a workpiece concentrically with the inventive power chuck, the actuating member and the drive members can be rigidly connected to each other so that the gimbal mounting therebetween is bridged.

Accordingly, it is an object of the invention to provide an impoved power chuck in which the workpiece may be evenly grasped either concentrically or eccentrically.

The inventive power chuck is not only universally usable for balanced or centric clamping of a workpiece, but is also very simple in construction and thus extremely reliable in operation and can be manufactured inexpensively. The idea of coupling the actuating member to the individual drive members through one or two gimbal rings makes it possible to obtain a reliable and balanced clamping at low costs. And since the gimbal suspension by which unequal displacements of the jaws are compensated for, can be bridged, a uniform actuation of the drive members and thus a centric clamping may also be obtained.

The inventive power chuck comprises a single actuating member which can be connected to the drive members in two different ways. At most two pressurized spaces are to be sealed, namely if an exposure at both sides to pressure fluid of the actuating member is provided. However, the actuating member may also be made displaceable by means of springs or a connecting rod. Disturbances in operation due to leaks are thereby widely eliminated, safety in operation is considerably increased, and a long life is ensured since the transmission of the necessary forces from the actuating member through the gimbals to the drive members is almost friction-free, and, consequently, the wear is minimized.

Accordingly, it is an object of the invention to provide an improved power chuck in which the drive members for the chuck jaw are connected by gimbals to the actuator.

A further object of the invention is to provide a power chuck which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
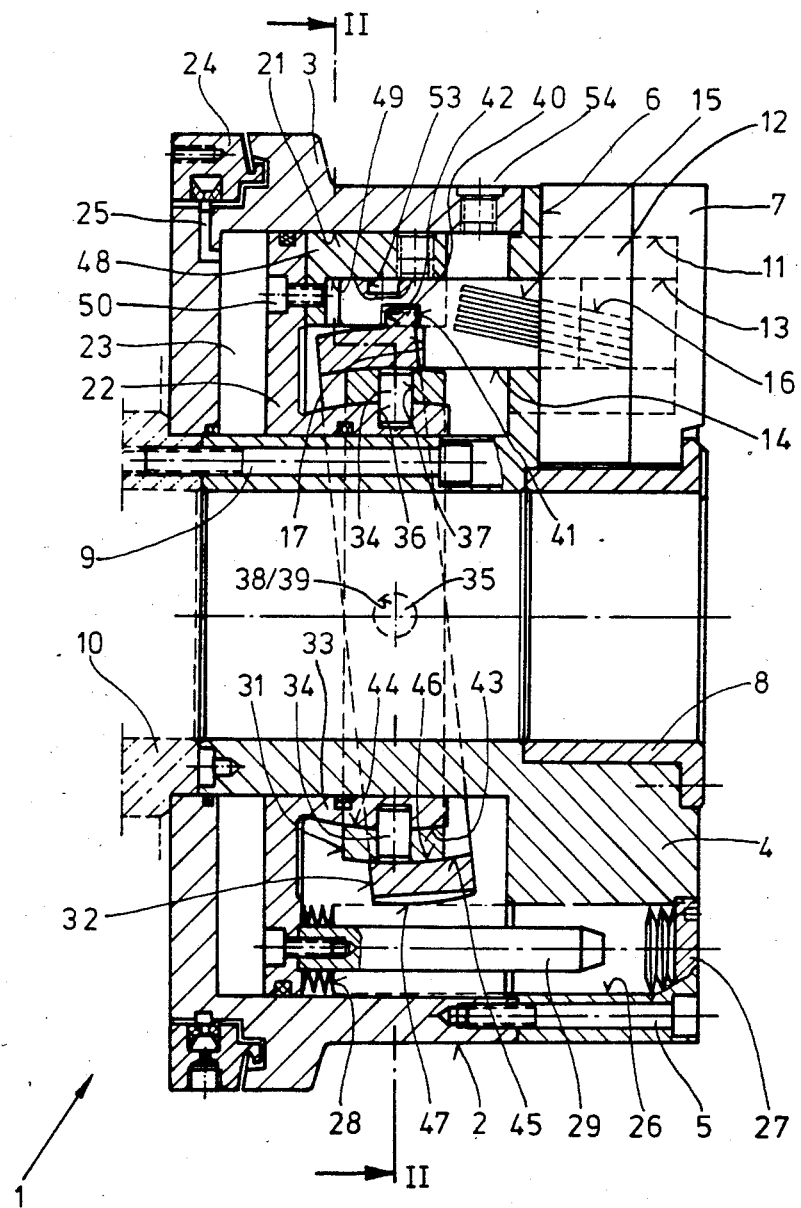
FIG. 1 is an axial sectional view of an inventive power chuck with the actuating member being coupled to the drive members through two gimbal rings, for balanced clamping.
Figure 2:
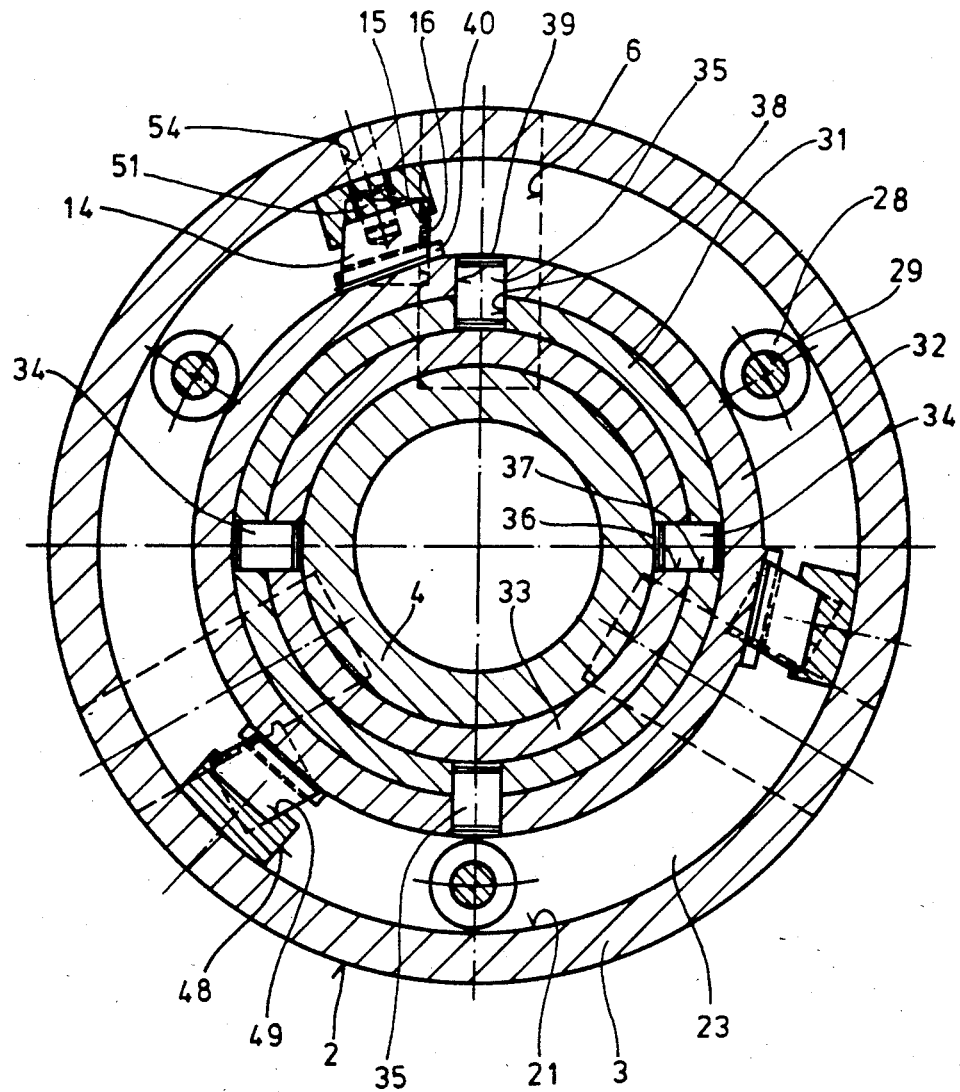
FIG. 2 is a sectional view taken along the line II—II of FIG. 1.

The power chuck shown in FIGS. 1–4 and generally designated 1 comprises a chuck body 2 of two parts 3 and 4 firmly connected to each other by screws 5, and master or clamping jaws 7 which are inserted for displacement in radially extending grooves 6 closed at their inside by a sleeve 8, and are movable by means of drive members 14 which are mounted laterally of the jaws 7. For this purpose, each drive member 14 is received in a bushing 12 inserted in a bore 11 of chuck body part 4 and is displaceable in recesses 13 provided in the bushings. Drive members 14 and jaws 7 are engaged with each other through teeth which are provided both on the drive members at 15 and the jaws at 16.

Chuck body 2 is secured to the spindle nose 10 of a machine tool by screws 9.

To displace drive members 14, an actuating member 22 is received for displacement in a cylindrical space 21 of chuck body 2 and, in this example, displaceable from one side by a pressure fluid and from its other side by a spring force. The pressure fluid can be supplied into the pressure space 23 associated with actuating member 22 in a controlled manner through a supply ring 24 and a passage 25. The spring force at the other side is permanently exerted by cup springs 28 which are assembled to stacks inserted in axial bores 26 which are closed each by a cover 27 and engaged or guided on a pin 29 secured to actuating member 22. Consequently, in power chuck 1, the workpiece is clamped between jaws 7 by the force of springs 28, while for disengaging the workpiece, pressure fluid must be supplied to space 23 to produce a thust on actuating member 22 and thus counteract springs 28.

To compensate for unequal displacements of jaws 7, thus to produce balanced forces clamping the workpiece, actuating member 22 according to FIG. 1 is coupled to the individual drive members 14 through two gimbal rings 31 and 32. For this purpose, an axially protruding extension 53 is provided on actuating member 22, radially inside drive members 14, to which the inner gimbal ring 31 is hinged by means of two pins 34. The outer gimbal ring 32 is hinged to the inner one by means of pins 35 which are provided at locations offset through 90° relative to pins 34. Pins 34 are pivotally retained in bores 36, 37 of extensions 33 and of inner ring 31, respectively, and pins 35 are retained in bores 38,39 of inner ring 31 and of outer ring 32, respectively. Outer gimbal ring 32 is positively connected to each of the drive members 14 through extensions 40 which are provided with spherically curved contact surfaces 41 and engage grooves 42 of drive members 14. The pivotal connection of the rings to each other and to the extension 33 establish a universal joint-like motion which can move the drive members 14 axially together while also allowing relative movement therebetween for equalizing forces.

The surfaces facing each other of extensions 33, inner gimbal ring 31, and outer gimbal ring 32, and the outer surface of the latter are designed as spherical guide surfaces 43,44,45,46.47 so that these parts are mounted in engagement with each other. Further, drive members 14 are designed with a shoulder 17 at their end close to actuating member 22, which shoulder corresponds to approximately the thickness and width of outer gimbal ring 32 so that this ring extends into shoulder 17.

To support drive members 14, guide rails 48 are provided which are secured by screws 50 to actuating member 22 and have each a guide groove 49. Drive members 14 are thus guided over their entire axial length, and canting is eliminated.

As soon as pressure space 23 in the chuck is vented, actuating member 22 is displaced by the action of cup springs 28 to the left (FIG. 1). This displacement is transmitted through rings 31, 32 to drive members 14, so that jaws 7 are displaced inwardly, initially conjointly, until one of the jaws comes into contact with the workpiece to be clamped and thus encounters an increased resistance. This resistance, however, does not yet produce a clamping force, since the other jaws, due to the gimbal suspension 31,32 are moved farther. Only after all jaws have come into contact with the workpiece, the force of springs 28 is transmitted uniformly through actuating member 22, rings 31 and 32, and drive members 14 to jaws 7. The unequal displacements of the jaws are compensated for by the pivotal motion of gimbal rings 31, 32 and the result is a balanced clamping of the workpiece in the chuck 1.

Figure 3:
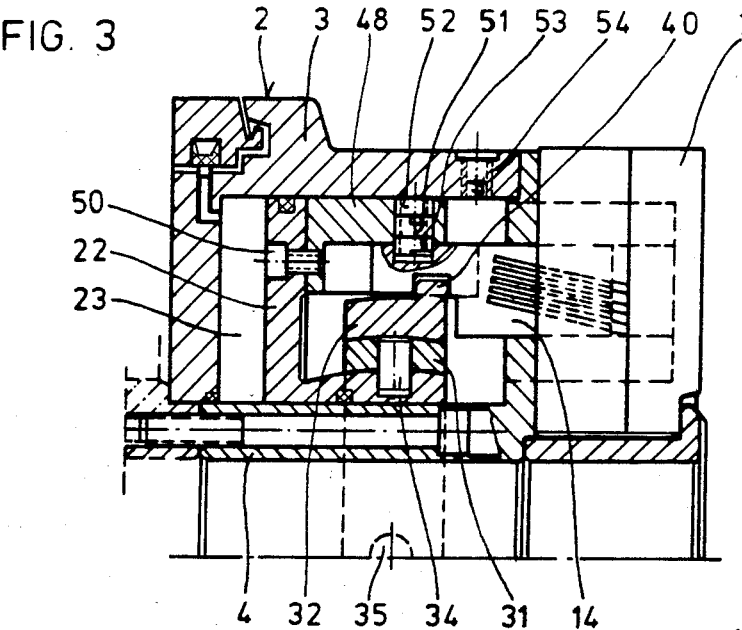
FIG. 3 shows the chuck of FIG. 1 locked for centric clamping.

To effect a centric clamping the gimbal suspension between actuating member 22 and drive members 14 must be bridged. To this end, as shown in FIG. 3, connecting elements in the form of screws 51 which are received in radial tap-holes 52 provided in guide rails 48, must be turned to engage grooves 53 which are provided in drive members 14. Further, actuating member 22 must be displaced to the right by supplying pressure fluid to space 23, to bring tap-holes 52 about into alignment with bores 54 which are provided in chuck body 2, and thus to enable screws 51 to be turned by means of a screwdriver plate.

Figure 4:
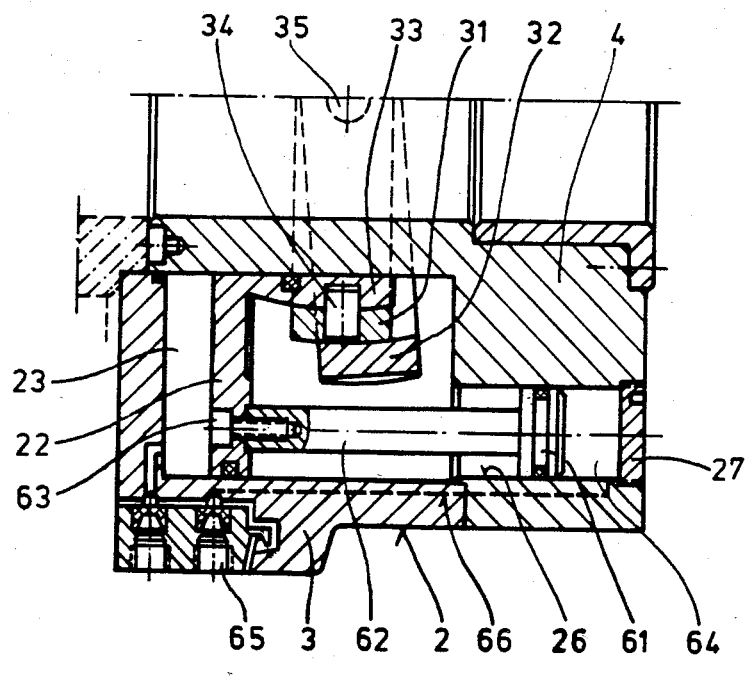
FIG. 4 shows the chuck of FIG. 1 with the actuating member being exposed to pressure at both sides.

Actuating member 22 may also be designed with piston surfaces exposable to pressure fluid on both sides, as shown in FIG. 4. In this design, piston rods 62 carrying the pistons 61 are secured by screws 63 to actuating member 22 and the pistons are displaceable in bores 26. Pressure spaces 64 are thereby formed which are opposite to pressure space 23 and can be supplied with pressure fluid which, with pressure space 23 vented, will displace actuating member 22 to the left. The pressure fluid can be supplied to spaces 64 through a supply ring 65 and conduits 66 provided in chuck body 2.

Figure 5:
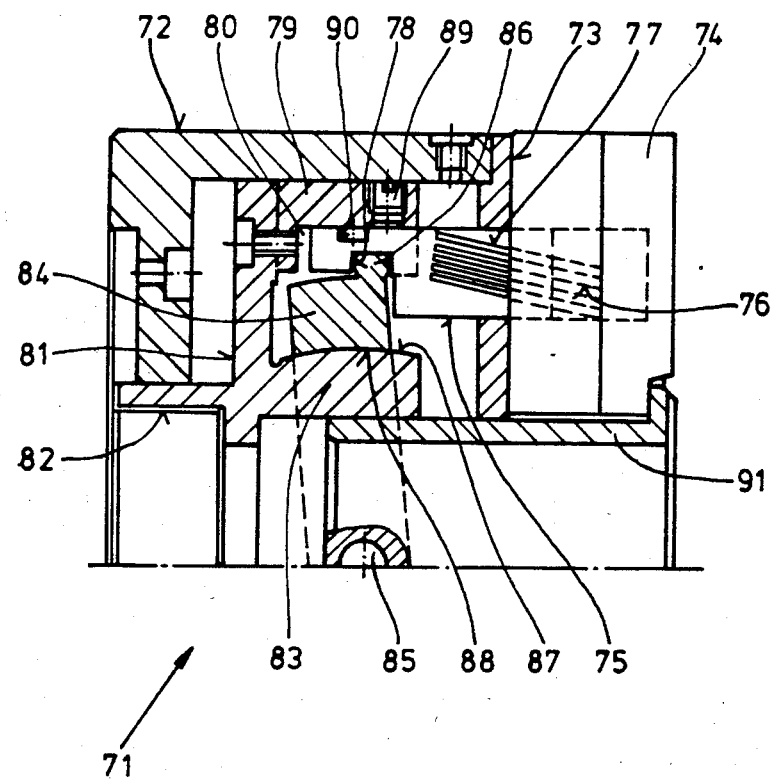
FIG. 5 shows a two-jaw chuck actuable through a connecting rod and comprising a single gimbal ring.

FIG. 5 shows a two-jaw chuck 71 wherein an actuating member 81 displaceable in a chuck body 72 is coupled to drive members 72 through a gimbal ring 84, to ensure a balanced clamping. The drive members 75 are in drive connection with jaws 74 which are guided in radially extending grooves 73. The actuating member 81 is displaceable in both directions by means of a connecting rod (not shown) which can be screwed into a thread 82 of member 81.

Radially inwardly of drive members 75, actuating member 81 is provided with an axially projecting extension 83 to which a gimbal ring 84 is hinged. The hinge is formed by two diametrally opposite pins 85 which are retained in extension 83, and about which ring 84 can pivot. Since the surfaces 87,88 facing each other of extension 83 and ring 84 are spherical, these two parts are guided within each other. Ring 84 and the two drive members 75 are positively connected to each other by means of extensions 86 which are formed on ring 84 and offset through 90° relative to pins 85, and of grooves 78 provided in drive member 75 and engaged by extensions 86.

Upon displacing actuating member 81 to the right, during which motion this member is guided without canting in chuck body 72, and by a sleeve 91 inserted therein, drive members 75, which are coupled to the actuating member through gimbal ring 84 and guided in grooves 80 of rails 79, are also displaced to the right. Thereby, since they are engaged through teeth 76 and 77 with drive members 75, jaws 74 are moved in grooves 73 outwardly, until they come into contact with the workpiece to be clamped. If initially only one of jaws 74 contacts the workpiece because of an off-center position or non-circular contour thereof, still no clamping force is exerted, the other jaw is rather moved farther until it also applies against the workpiece. The unequal advances of the jaws are compensated for by gimbal ring 84 which is pivoted about the two pins 85 provided at locations offset through 90° relative to extensions 86. With a chuck 71 as shown in FIG. 5 where the other jaw (not shwon) is in its outer position, again a balanced clamping is obtained, only, unlike in the embodiment of FIG. 1 intended for external chucking, the jaws apply from the inside.

For centered clamping, a bridging of the gimbal mounting is provided in this embodiment too. As according to FIG. 1, connecting elements in the form of screws 89 are retained in guide rails 79, and are turned to engage associated recesses 90 of drive members 75, which are thereby rigidly connected to actuating member 81 whose movements are thus transmitted directly to drive members 84 and the jaws 74.

While specific embodiments of the invention have been shown and described in detail to illustrate the application of the principles of the invention, it will be understood that the invention may be embodied otherwise without departing from such principles.

What is claimed is:

1. A power chuck particularly for turning machines, comprising a chuck body, a plurality of clamping jaws guided in said body for radial displacement outwardly and inwardly, said chuck body having grooves along which said jaws are guided, a plurality of drive members arranged in said body each adjacent one of said jaws and each being displaceable in an axial direction and having an oblique surface engaging a respective jaw so as to move said jaws radially upon axial displacement of said drive members, an actuating member axially movable in said chuck for moving said drive members, and two pivotally mounted gimbal rings connected between all of said drive members and said actuating member for moving said drive members and providing compensation for unequal displacement of said jaws; said two gimbal rings being mounted one within the other with the inner one being hinged to the actuating member and to the outer gimbal ring, said outer gimbal ring being positively connected to said drive members.

2. A power chuck according to claim 1, wherein each of said drive members includes a concave groove, said outer gimbal ring including a plurality of extensions each extending into one of said concave grooves for directly driving said drive members with axial movement of said actuating member.

3. A power chuck according to claim 2, wherein said drive members include an end adjacent said actuating member which is recessed by a step corresponding to the thickness and width of the outer gimbal ring.

4. A power chuck according to claim 3, wherein there is an inwardly open guide rail provided at each of said drive member locations on a portion thereof remote from the jaws of said actuating member, said drive members being retained therein for dispalcement.

5. A power chuck according to claim 3, including means wherein said drive members are rigidly coupled to said actuating member in order to eliminate said gimbal mounting.

6. A power chuck according to claim 4, wherein to connect said actuating member rigidly to said individual drive members, said chuck includes a connecting element retained in said actuating member directly or through an intermediate member on each drive member which may be engaged therewith.

7. A power chuck according to claim 5, wherein said means comprises a radial taphole is provided in each of said drive members into which a connecting element is screwed to interlock the respective parts.

8. A power chuck according to claim 1, wherein said actuating member comprises a control piston which is exposed on one side to pressure fluid and to the other side to the action of springs, spring means biasing said piston on said other side.

9. A power chuck for a turning machine comprising:
a chuck body having a plurality of radial grooves therein;
a plurality of jaws each disposed in one of said radial grooves for radial inward and outward motion, each jaw having an oblique surface;
a plurality of drive members axially movable in said chuck body, each drive member having an oblique surface for engagement with an oblique surface of one of said jaws for radial movement of each respective jaw with axial movement of each respective drive member;
an actuating member axially movable in said chuck body, said actuating member having an extension with a spherical surface thereon;
a first gimbal ring having a first spherical surface engaged with said spherical surface of said actuating member extension and pivotally mounted with respect to said extension, said first gimbal ring having a second spherical surface;
a second gimbal ring having a spherical surface engaged with said spherical surface of said first gimbal ring and pivotally mounted to said first gimbal ring, said second gimbal ring engaged with each other of said drive members for driving said drive members axially with axial movement of said actuating member while permitting relative axial movement among said drive members; and
universal joint connection means connected between said actuating member extension, said first and said second gimbal rings for permitting universal pivotal action of said second gimbal ring with respect to said actuating member.

10. A power chuck according to claim 9, wherein said universal joint connecting means comprises a first pair of pins connected between said extension and said first gimbal ring for allowing pivotal movement of said first gimbal ring about a first radial axis and a second pair of pins connected between said first and second gimbal rings for permitting relative pivotal movement between said first and second gimbal rings about a second radial axis which is perpendicular to said first radial axis.

11. A power chuck according to claim 9, wherein said second gimbal ring includes a plurality of radial projections, each of said drive members includes a concave recess for receiving one of said radial projections.

12. A power chuck according to claim 9 wherein each drive member includes a step having a radial width substantially equal to a radial width of said second gimbal ring.

13. A power chuck according to claim 9, including bridge means engageable directly between said actuating member and each drive member for bypassing the universal action of said first and second gimbal rings.

14. A power chuck particularly for turning machines, comprising a chuck body, a plurality of clamping jaws guided in said body for radial displacement outwardly and inwardly, said chuck body having grooves along which said jaws are guided, a plurality of drive members arranged in said body each adjacent one of said jaws and each being displaceable in an axial direction and having an oblique surface engaging a respective jaw so as to move said jaws radially upon axial displacement of said drive members, an actuating member axially movable in said chuck for moving said drive members, and two pivotally mounted gimbal rings connected between all of said drive members and said actuating member for moving said drive members and providing compensation for unequal displacement of said jaws, said at least one gimbal ring including an inner gimbal ring and an outer gimbal ring having outwardly facing extension surfaces comprising spherical guide surfaces.

15. A power chuck comprising, a chuck body having a plurality of radial grooves therein, a plurality of clamping jaws each guided in one of said radial grooves for radial inward and outward displacement, a plurality of drive members arranged in said body for axial displacement, each drive member engaged with one of said clamping jaws for radial displacement of said clamping jaws with axial displacement of said drive members, an actuating member axially movable in said chuck and having an extension which project toward said drive members and disposed radially inwardly of said drive members, an inner gimbal ring pivotally mounted to said actuating member extension by means of two diametrically opposed pins for pivoting of said inner gimbal ring about one radial axis with respect to said actuating member, and an outer gimbal ring hinged to said inner gimbal ring by means of two bolts which are offset by 90° relative to the pins of said inner gimbal ring, said outer gimbal ring being engaged with each of said drive member for moving each drive member axially with axial movement of said actuating member while permitting relative axial movement between drive members by virtue of pivoting of said inner gimbal ring.

16. A power chuck according to claim 15, wherein said actuating member extension has a spherical surface mating with an inner spherical surface of said inner gimbal ring.

* * * * *